(12) United States Patent
Sakaguchi et al.

(10) Patent No.: US 8,844,401 B2
(45) Date of Patent: Sep. 30, 2014

(54) ACCELERATOR PEDAL DEPRESSION FORCE CONTROL DEVICE

(75) Inventors: Shigeyuki Sakaguchi, Yokohama (JP); Masao Shiomi, Sagamihara (JP); Masahiro Omori, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/701,994

(22) PCT Filed: Apr. 20, 2011

(86) PCT No.: PCT/JP2011/059707
§ 371 (c)(1),
(2), (4) Date: Dec. 4, 2012

(87) PCT Pub. No.: WO2011/155268
PCT Pub. Date: Dec. 15, 2011

(65) Prior Publication Data
US 2013/0074644 A1 Mar. 28, 2013

(30) Foreign Application Priority Data
Jun. 7, 2010 (JP) ................................ 2010-129620

(51) Int. Cl.
G05G 1/30 (2008.04)
F02D 11/02 (2006.01)
G05G 1/38 (2008.04)
B60K 26/02 (2006.01)

(52) U.S. Cl.
CPC ............ *G05G 1/38* (2013.01); *B60K 2026/023* (2013.01); *B60K 26/02* (2013.01); *F02D 11/02* (2013.01)
USPC ............................................. 74/513; 701/70

(58) Field of Classification Search
None
See application file for complete search history.

(56) References Cited

U.S. PATENT DOCUMENTS

| 7,311,637 | B2 * | 12/2007 | Kitamura et al. | 477/121 |
| 7,729,859 | B2 * | 6/2010 | Kimura et al. | 701/301 |
| 7,826,970 | B2 * | 11/2010 | Kobayashi et al. | 701/300 |
| 7,894,988 | B2 * | 2/2011 | Kimura et al. | 701/301 |
| 7,908,065 | B2 * | 3/2011 | Kuwahara et al. | 701/51 |

(Continued)

FOREIGN PATENT DOCUMENTS

| JP | 2003-120339 A | 4/2003 | |
| JP | 2005-132225 A * | 5/2005 | ............ B60K 26/04 |

(Continued)

OTHER PUBLICATIONS

Extended European Search Report, Nov. 25, 2013, 5 pages.

*Primary Examiner* — John R Olszewski
*Assistant Examiner* — James M McPherson
(74) *Attorney, Agent, or Firm* — Foley & Lardner LLP

(57) ABSTRACT

When the accelerator opening degree becomes equal to or smaller than an increase amount cancel threshold value (timing t2) while the depression force of an accelerator pedal 2 is increased than a base depression force by a predetermined increase amount of the depression force, the predetermined increase amount of the depression force is decreased at a predetermined rate, and moreover, when the accelerator opening degree becomes greater than a predetermined accelerator opening degree threshold value (timing t3) while the predetermined increase amount of the depression force is decreased, the depression force of the accelerator pedal 2 is increased with respect to the base depression force so that the increase amount of the depression force with respect to the base depression force becomes greater than the predetermined increase amount of the depression force.

6 Claims, 3 Drawing Sheets

(56) References Cited

U.S. PATENT DOCUMENTS

| | | | |
|---|---|---|---|
| 8,090,517 B2 * | 1/2012 | Kobayashi et al. | 701/94 |
| 8,255,124 B2 * | 8/2012 | Van Houten et al. | 701/49 |
| 8,401,759 B2 * | 3/2013 | Shiomi et al. | 701/70 |
| 8,433,492 B2 * | 4/2013 | Shiomi et al. | 701/70 |
| 8,527,171 B2 * | 9/2013 | Sugano et al. | 701/70 |
| 2003/0135317 A1 * | 7/2003 | Hijikata et al. | 701/70 |
| 2003/0236624 A1 * | 12/2003 | Kimura et al. | 701/301 |
| 2004/0225424 A1 * | 11/2004 | Yamamura et al. | 701/36 |
| 2007/0213916 A1 * | 9/2007 | Sugano et al. | 701/96 |
| 2009/0105953 A1 * | 4/2009 | Sugano et al. | 701/301 |
| 2010/0204883 A1 * | 8/2010 | Honda | 701/36 |
| 2011/0087414 A1 | 4/2011 | Shiomi et al. | |
| 2011/0098900 A1 | 4/2011 | Shiomi et al. | |
| 2011/0098901 A1 * | 4/2011 | Shiomi et al. | 701/70 |
| 2011/0125367 A1 | 5/2011 | Sakaguchi et al. | |
| 2012/0059563 A1 * | 3/2012 | Sakaguchi et al. | 701/70 |

FOREIGN PATENT DOCUMENTS

| | | | |
|---|---|---|---|
| JP | 2005-162018 A | | 6/2005 |
| JP | 2010-52718 A | | 3/2010 |
| JP | 2010-052720 A | | 3/2010 |
| JP | 2010-52721 A | | 3/2010 |
| JP | 2011-63150 A | | 3/2011 |
| WO | WO 2010/013130 A1 | | 2/2010 |
| WO | WO2011033353 | * | 3/2011 |

* cited by examiner

1 — VEHICLE BODY
2 — ACCELERATOR PEDAL
3 — ROTATION SHAFT
4 — RETURN SPRING
5 — BEARING
6 — ACCELERATOR POSITION SENSOR
7 — VARIABLE FRICTION PLATE
7a — FRICTION MEMBER
7b — FRICTION MEMBER
8 — FIXED SHAFT
9 — ACTUATOR
10 — CONTROL UNIT

ACCELERATOR PEDAL DEPRESSION FORCE CONTROL DEVICE

TECHNICAL FIELD

This invention relates to an accelerator pedal depression force control apparatus.

BACKGROUND ART

A Patent Document 1 discloses an art that is applied to an engine arranged to switch a first driving method (for example, homogeneous combustion) on a high rotation and high load side, and a second driving method (for example, stratified charge combustion) on a low rotation and low load side on which a fuel economy efficiency is higher than that of the first driving method, and that is configured to immediately increase a depression reaction force (depression force) of an accelerator pedal when the driving region of the engine enters a boundary driving region just before the switching to the first driving region when the driving region of the engine is switched from the second driving region in which the second driving method is performed, to the first driving region in which the first driving method is performed. This increase amount of the depression force is canceled when the driving region of the engine is returned from the boundary driving region to the second driving region.

In this case, when the increase amount of the depression force is suddenly returned (decreased) in a case where the increase amount of the depression force immediately increased when the driving region enters from the second driving region to the boundary driving region is restored (returned), the accelerator pedal may be excessively depressed by that reaction. Accordingly, it is preferable to gradually return this increase amount of the depression force for preventing the excessive depression of the accelerator pedal.

However, in a case where this increase amount of the depression force is gradually returned, the increase amount of the depression force becomes small when the depression force needs to suddenly increase in the middle of the gradual return of the increase amount of the depression force. Accordingly, there is generated a problem that the driver cannot feel the sudden increase of the depression force, that is, a wall feeling which is the depression feeling of the accelerator pedal.

PRIOR ART DOCUMENT

Patent Document

Patent Document 1: Japanese Patent Application Publication No. 2003-120339

SUMMARY OF THE INVENTION

In the present invention, the accelerator pedal depression force control apparatus is configured to decrease the predetermined increase amount of the depression force which is added to the base depression force at a predetermined rate when a predetermined depression force increase cancel condition is satisfied when the depression force of the accelerator pedal is increased than the base depression force, and to increase the depression force of the accelerator pedal with respect to the base depression force so that the increase amount of the depression force with respect to the base depression force becomes greater than the predetermined increase amount of the depression force when the accelerator opening degree becomes greater than the predetermined accelerator opening degree threshold value while the predetermined increase amount of the depression force is decreased.

By the present invention, it is possible to surely feel the increase of the accelerator pedal by the driver when the accelerator pedal opening degree becomes greater than the accelerator opening degree threshold value while the increase amount of the depression force of the accelerator pedal is decreased.

DESCRIPTION OF EMBODIMENTS

Hereinafter, one embodiment of the present invention will be illustrated in detail with reference to the drawings.

This accelerator pedal depression force control apparatus is basically configured to variably control a depression force (operation reaction force) of an accelerator pedal 2 provided to a vehicle body 1 of a vehicle (not shown). As described below, the accelerator pedal depression force control apparatus includes a means configured to sense an opening degree (depression amount) of the accelerator pedal 2 provided to the vehicle, and a means configured to vary the depression force of the accelerator pedal 2 from a base depression force. The accelerator pedal depression force control apparatus is configured to increase the depression force of the accelerator pedal 2 than (beyond) the base depression force in a region where the opening degree of the accelerator pedal 2 is greater than a predetermined accelerator pedal opening degree threshold value.

Figure 1:
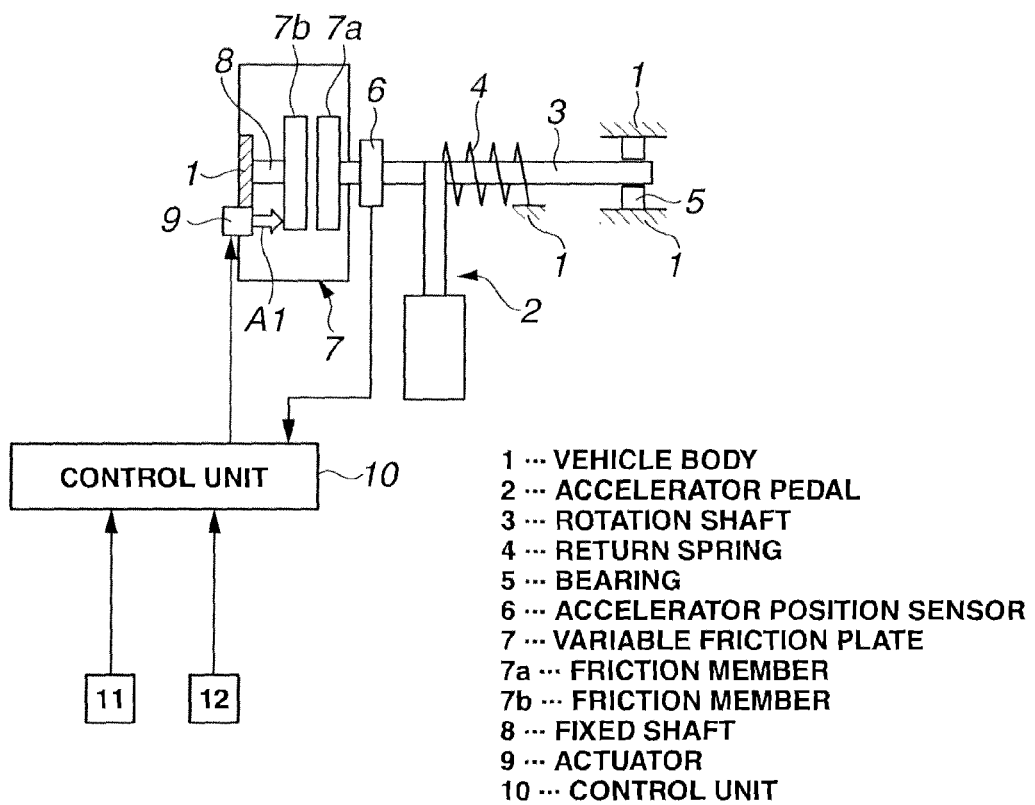
FIG. 1 is an explanatory view schematically showing a system configuration of an accelerator pedal depression force control apparatus according to the present invention, and a schematic configuration of a depression force varying mechanism.
Figure 2:
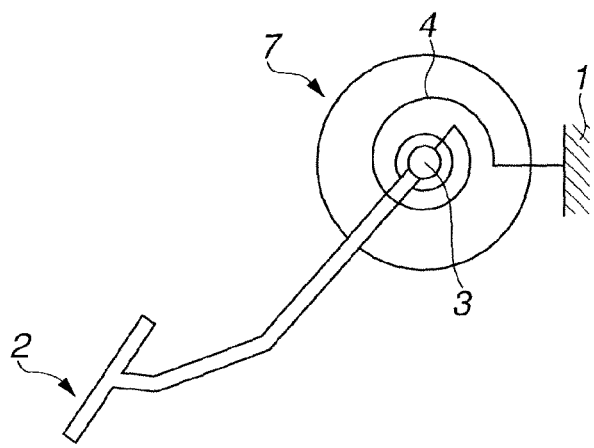
FIG. 2 is an explanatory view schematically showing the depression force varying mechanism according to the one embodiment of the present invention.

As shown in FIGS. 1 and 2, the accelerator pedal 2 is provided on a rotation shaft 3. The accelerator pedal 2 is arranged to be swung about the rotation shaft 3. The accelerator pedal 2 receives a reaction force in an accelerator closing direction by a return spring 4 which may have various shapes, and which has one end fixed to the vehicle body 1, and the other end fixed to the rotation shaft 3. Moreover, one end of the rotation shaft 3 is rotatably supported by the vehicle body 1 through a bearing 5. On the other hand, an accelerator position sensor 6 serving as an accelerator opening degree sensing means is provided near the other end of the rotation shaft 3.

In this embodiment, the depression amount of the accelerator pedal 2 (the accelerator opening degree) and an opening degree of a throttle valve (not shown) of an internal combustion engine (not shown) are coordinated with each other. The opening degree of the throttle valve of the internal combustion engine is increased in accordance with the depression amount of the accelerator pedal 2. That is, a fuel injection amount (and then a fuel consumption amount) is increased in accordance with the accelerator opening degree.

The depression force varying mechanism is constituted by a variable friction plate 7 including a pair of friction members 7a and 7b which confront each other, and which are arranged to provide the frictional force to the rotation of the rotation shaft 3. One friction member 7a is mechanically connected to an end portion of the rotation shaft 3. The other friction member 7b is supported through splines and so on to a fixed shaft 8 so as to be moved in an axial direction, and so as not to be rotated. The fixed shaft 8 is fixed to and supported by the vehicle body 1. Moreover, an actuator (for example, electromagnetic solenoid) 9 arranged to urge the friction member 7b toward the friction member 7a is fixed to the vehicle body 1.

The variable friction plate 7 moves the friction member 7b in the axial direction (in a direction of an arrow A1 in FIG. 1) by the actuation of the actuator 9. With this, the variable friction plate 7 variably controls the friction force between the friction member 7a and the friction member 7b. This actuation of the actuator 9 is controlled is by the control unit 10. Accordingly, it is possible to vary the friction force applied to the rotation shaft 3, and then the depression force at the depression of the accelerator pedal 2, by controlling the actuation of the actuator 9 by the control unit 10.

The control unit 10 receives the signals from various sensors such as the above-described accelerator position sensor 6 arranged to sense the opening degree of the accelerator pedal 2, an engine speed sensor 11 arranged to sense an engine speed Ne, and a vehicle speed sensor 12 arranged to sense a vehicle speed VSP.

Figure 3:
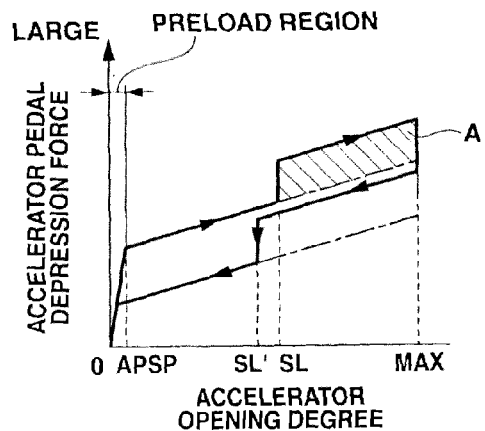
FIG. 3 is a characteristic view showing an example of a characteristic of an accelerator pedal depression force in the present invention.

FIG. 3 schematically shows a characteristic of the depression force of the accelerator pedal in the above-described embodiment. A basic depression force, that is, a base depression force is increased to be substantially proportional to the accelerator opening degree while having an appropriate hysteresis in the opening degree increasing direction and in the opening degree decreasing direction. Moreover, an initial region (preload region) in which the base depression force is suddenly increased is set in a small accelerator opening degree region.

That is, the base depression force is proportionally increased in the increasing direction of the accelerator opening degree from a predetermined minute opening degree (an accelerator opening degree APSP) to a maximum opening degree (an accelerator opening degree MAX). The initial region in which the accelerator opening degree is from zero to the minute opening degree is the preload region in which the base depression force is increased at a relatively large rate in accordance with the increase of the accelerator opening degree.

When the accelerator opening degree becomes greater than a predetermined accelerator opening degree threshold value (SL in FIG. 3) at the operation in the increasing direction of the opening degree, that is, at the depression, the depression force of the accelerator pedal 2 is increased than the base depression force on the depression side in a stepped manner, so as to suppress the further depression. That is, the depression force increase amount A is added to the base depression force on the depression side.

Moreover, when the accelerator pedal 2 is returned (the accelerator opening degree is decreased) in a state where the depression force increase amount A is added to the base depression force on the depression side of the depression force of the accelerator pedal, the above-described described depression force increase amount A is added to the base depression force (the base depression force in the decreasing direction of the accelerator opening degree which has the hysteresis with respect to the base depression force in the increasing direction of the accelerator opening degree) in a region where the accelerator opening degree is greater than the accelerator opening degree threshold value SL, as shown in FIG. 3. Furthermore, the addition of this depression force increase amount A continues up to an increase amount cancel (release) threshold value (SL' in FIG. 3) which is smaller than the accelerator opening degree threshold value (SL in FIG. 3) by a predetermined opening degree. Then, when the accelerator opening degree is decreased to be equal to or smaller than the increase amount cancel threshold value, the depression force increase amount A is canceled, and the accelerator pedal depression force is returned to the base depression force (the base depression force in the decreasing direction of the accelerator opening degree).

In this case, the accelerator opening degree threshold value is a value relating to a fuel consumption rate (the accelerator opening degree at which the driving state is switched from the driving state in which the fuel consumption rate is low, to the driving state in which the fuel consumption rate is high). The accelerator opening degree threshold value is set by the control unit 10 based on the driving state of the vehicle or the engine. In this way, the further depression of the accelerator pedal 2 by the driver is naturally suppressed by increasing the depression force of the accelerator pedal in the stepped manner. At the same time, it is possible to surely inform the driver of the transition from the driving state in which the fuel consumption rate is low (that is, the fuel economy is good), to the driving state in which the fuel consumption rate is high (that is, the fuel economy is bad).

The control unit 10 sets the above-described accelerator opening degree threshold value, and sets the above-described increase amount cancel threshold value as the depression force increase cancel condition (condition for canceling the depression force increase). When the accelerator opening degree becomes greater than the accelerator opening degree threshold value, the control unit 10 adds the predetermined depression force increase amount to the base depression force of the accelerator pedal 2. Moreover, when the accelerator opening degree becomes equal to or smaller than the increase amount cancel threshold value in a state where the predetermined depression force increase amount is added, it is deemed that the depression force increase cancel condition is satisfied, and the control unit 10 eliminates the base depression force of the accelerator pedal 2 by decreasing the predetermined depression force increase amount at the predetermined constant rate.

In this case, the increase amount cancel threshold value is set as the accelerator opening degree smaller than the accelerator opening degree threshold value in the same driving state of the vehicle or in the same driving state of the engine. For example, the increase amount cancel threshold value is set to have a difference of a constant opening degree (a constant opening degree difference) with respect to the accelerator opening degree threshold value.

For example, the accelerator opening degree threshold value is set in accordance with an engagement and a disengagement of a lockup clutch (not shown) of an automatic transmission of the torque converter type. To explain by using FIG. 4, as is well known, this lockup clutch is a mechanism directly connecting an input side and an output side of a torque converter. This lockup clutch is controlled to be switched to engage or disengage based on the vehicle speed VSP and the accelerator opening degree APS. This lockup clutch becomes the disengaged state in a non-lockup (non-L/U) region (a region shown by hatched lines in FIG. 4) in which the accelerator opening degree APS is large in the low vehicle speed side. This lockup clutch becomes the engaged state in a lockup (L/U) region in which the accelerator opening degree APS is small in the high vehicle speed side. In this case, the fuel consumption rate is relatively deteriorated in the state where the lockup clutch is disengaged, relative to the state where the lockup clutch is engaged. Accordingly, in the case of this example, the non-lockup region is considered as the driving state region of the high fuel consumption rate, and the lockup region is considered as the driving state region of the low fuel consumption rate. When the accelerator opening degree APS is increased from the lockup region to the non-lockup region, the depression force of the accelerator pedal is increased.

Figure 4:
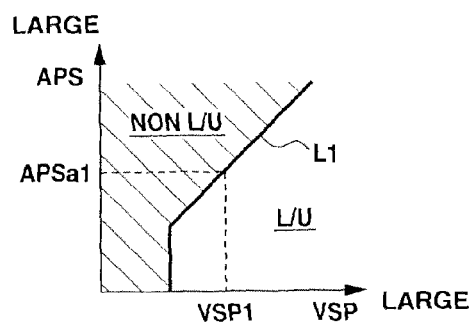
FIG. 4 is an explanatory view showing one example of correlation between an accelerator opening degree threshold value and a lockup region of a lockup clutch.

In this case, the control unit 10 judges whether the lockup clutch is in the disengaged state (the non-L/U region) or in the engaged state (the L/U region) from the inputted vehicle speed VSP and the inputted accelerator opening degree APS, based on the characteristic view of FIG. 4. When the lockup clutch is in the engaged state (the L/U region), a value of the accelerator opening degree APS on a boundary line L1 of the region of FIG. 4 which corresponds to the vehicle speed VSP inputted from the vehicle speed sensor is determined as an accelerator opening degree threshold value APSa1 for the increase of the depression force. For example, when the vehicle speed is VSP1, the corresponding accelerator opening degree APSa1 becomes the accelerator opening degree threshold value for the increase of the depression force of the accelerator pedal 2, as shown in the drawing. Moreover, the control unit 10 sets an increase amount cancel threshold value APSa1' as an accelerator opening degree which is smaller than this accelerator opening degree threshold value APSa1 by a predetermined opening degree. This increase amount cancel threshold value APSa1' is the threshold value of the accelerator opening degree for canceling, that is, decreasing the predetermined increase amount of the depression force which is increased once at the accelerator opening degree threshold value APSa1. When the accelerator opening degree becomes equal to or smaller than this increase amount cancel threshold value APSa1', the above-described depression force increase amount is canceled. For example, this increase amount cancel threshold value is set as the value having the constant opening degree difference with respect to the accelerator opening degree threshold value APSa1. Alternatively, this increase amount cancel threshold value can be calculated by multiplying the accelerator opening degree threshold value APSa1 by a constant coefficient. However, the method of obtaining the increase amount cancel threshold value is not limited to these methods.

Figure 5:
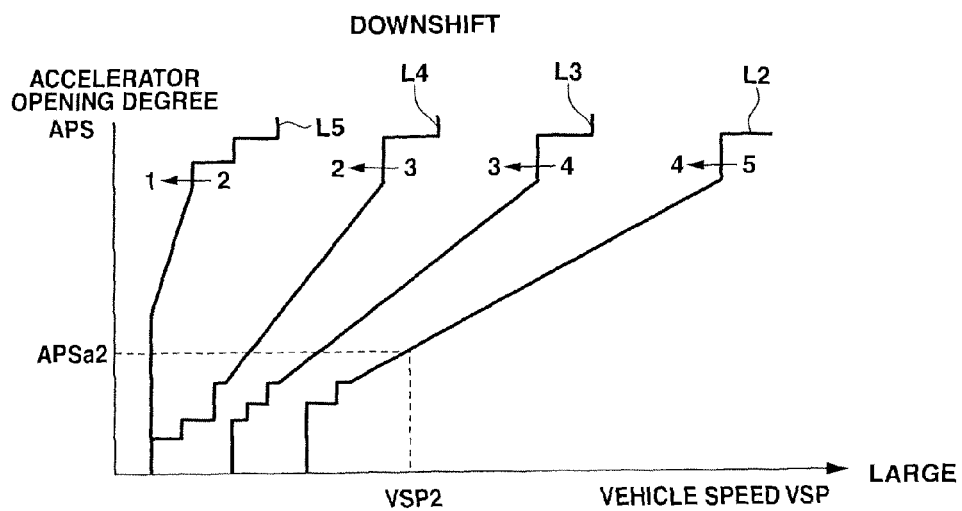
FIG. 5 is an explanatory view showing one example of correlation between the accelerator opening degree threshold value and a shift line of an automatic transmission.

Moreover, as shown in FIG. 5, the accelerator opening degree threshold value can be set to correspond to a downshift of the automatic transmission (the automatic shift to a low shift stage).

FIG. 5 shows, as one example, a shift diagram of a five-speed automatic transmission. As shown in the drawing, the shift control is performed based on the vehicle speed VSP and the accelerator opening degree APS. However, in general, the fuel consumption rate is low in the high shift stage. Accordingly, in this case, a shift line L2 from the fifth speed to the fourth speed is considered as a boundary line at which the fuel consumption rate is switched from the relatively low region to the relatively high region. Therefore, a value of the accelerator opening degree on this boundary line L2 which corresponds to the vehicle speed VSP (for example, VSP2) at that time becomes an accelerator opening degree threshold value APSa2. Besides, similarly, the accelerator opening degree threshold values may be set with respect to shift lines L3-L5 of the other shift stages. The increase amount cancel threshold value for canceling, that is, decreasing the predetermined increase amount of the depression force which is increased once at the accelerator opening degree threshold value APSa2 is set in the same manner as the increase amount cancel threshold value which is set to correspond to the engagement and the disengagement of the lockup clutch (not shown) in the automatic transmission of the torque converter type.

Besides, the accelerator opening degree threshold value can be set to correspond to a fuel increasing region on the high load side of the engine, in addition to the above-described method. The accelerator opening degree threshold value can be set from the characteristic of the fuel economy of the engine.

Moreover, the transmission may be, for example, a continuously-variable transmission in which the transmission gear ratio is continuously varied, or a manual transmission. In the case of the continuously-variable transmission, it is possible to calculate the transmission gear ratio, as the ratio between the rotational speed of the input shaft side and the rotational speed of the output shaft side.

Figure 6:
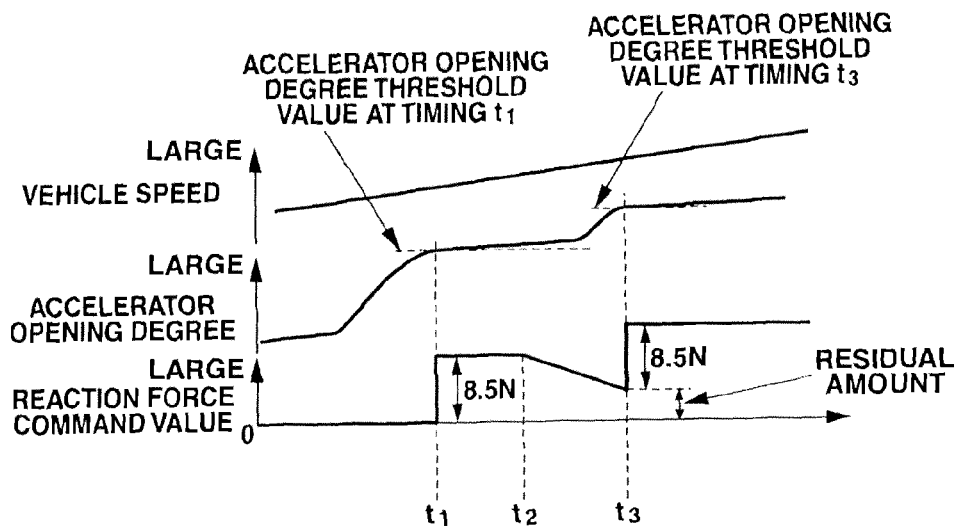
FIG. 6 is a timing chart showing various parameters in the one embodiment of the present invention.

Furthermore, in this embodiment, as shown in FIG. 6, when the accelerator opening degree becomes greater than the above-described accelerator opening degree threshold value (at timings t1 and t3 of FIG. 6), the depression force of the accelerator pedal 2 is increased based on a command value of the reaction force from the control unit 10.

In particular, in this embodiment, when the accelerator opening degree becomes greater than the accelerator opening degree threshold value (at the timing t1 of FIG. 6) in the state where the depression force of the accelerator pedal 2 is the base depression force, the depression force of the accelerator pedal 2 is increased, for example, by the depression force of 8.5 [N] as the predetermined increase amount of the depression force with respect to the base depression force.

When the accelerator opening degree becomes equal to or smaller than the increase amount cancel threshold value (at the timing t2 of FIG. 6) in a state where the depression force of the accelerator pedal 2 is increased than the base depression force, the predetermined increase amount of the depression force which is added to the base depression force is gradually decreased at the predetermined constant rate so that the depression force of the accelerator pedal 2 becomes the base depression force.

In this case, the accelerator opening degree threshold value is varied in accordance with the vehicle speed as described above. Accordingly, the increase amount cancel threshold value is also varied in accordance with the vehicle speed. In particular, when the vehicle speed is increased, the accelerator opening degree threshold value (the increase amount cancel threshold value) is increased. In the embodiment shown in FIG. 6, the accelerator opening degree at timing t2 does not become smaller than the accelerator opening degree at timing t1. However, the increase amount cancel threshold value is varied by the variation of the vehicle speed from the timing t1 to timing t2. Consequently, the accelerator opening degree becomes equal to or smaller than the increase amount cancel threshold value from timing t2.

Then, when the accelerator opening degree becomes greater than the accelerator opening degree threshold value again (the timing t3 of FIG. 6) while the predetermined increase amount of the depression force with respect to the base depression force is decreased, the increase amount of the depression force which is added at the timing (the timing t1 of FIG. 6) at which the accelerator opening degree becomes greater than the accelerator opening degree threshold value at the previous time is added to the depression force of the accelerator pedal 2 at this time.

That is, at timing t3 of FIG. 6, the increase amount of the depression force with respect to the base depression force is increased so as to become greater than the increase amount of the depression force which is added to the base depression force at the timing t1 of FIG. 6. That is, at the timing t3 of FIG. 6, the depression force of the accelerator pedal 2 is increased relative to the base depression force so that the summation of a residual amount of the increase amount of the depression force which is added to the base depression force at the timing t1 of FIG. 6, and the increase amount of the depression force which is added at this time becomes greater than the increase amount of the depression force which is added to the base depression force at the timing t1 of FIG. 6.

Besides, in the embodiment shown in FIG. 6, the accelerator opening degree threshold value is varied in accordance with the variation of the vehicle speed. Consequently, the accelerator opening degree becomes greater than the accelerator opening degree threshold value from the timing t3.

Figure 7:
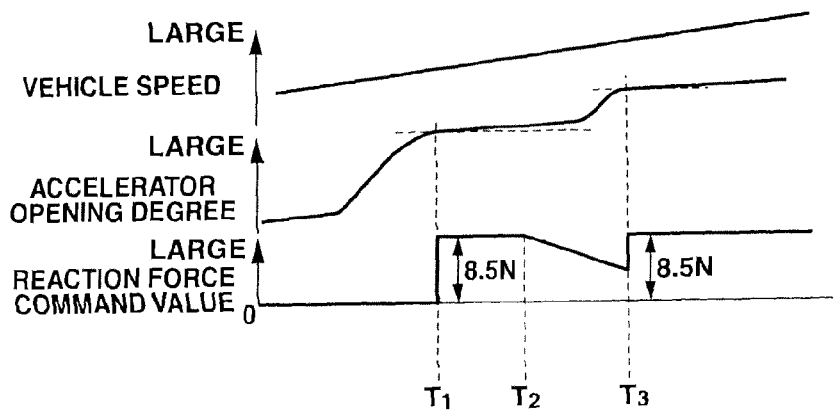
FIG. 7 is a timing chart showing various parameters in a comparative example with respect to the present invention.

If the increase amount of the depression force which is added when the accelerator opening degree exceeds the accelerator opening degree threshold value is always a constant amount with respect to the base depression force as in a comparative example shown in FIG. 7, the depression feeling of the accelerator pedal 2 that the driver feels at the timing T3 at which the accelerator opening degree becomes greater than the accelerator opening degree threshold value again when the predetermined increase amount of the depression force with respect to the base depression force is decreased is smaller in the variation amount of the depression force increase, relative to the depression feeling of the accelerator pedal 2 that the driver feels at the timing T1 at which the accelerator opening degree becomes greater than the accelerator opening degree threshold value in a state where the accelerator pedal depression force is the base depression force. Consequently, the driver is hard to feel the sudden increase of the depression force of the accelerator pedal. Besides, the timing T2 of FIG. 7 is a timing at which the accelerator opening degree becomes equal to or smaller than the increase amount cancel threshold value in the state in which the depression force of the accelerator pedal 2 is increased than the base depression force.

However, in the above-described embodiment, the increase amount of the depression force which is added when the accelerator opening degree exceeds the accelerator opening degree threshold value is increased with reference to the depression force at the timing at which the accelerator opening degree substantially exceeds the accelerator opening degree threshold value, not with reference to the base depression force. With this, the driver can surely feel the increase of the depression force of the accelerator pedal 2 even when the accelerator opening degree becomes greater than the predetermined accelerator opening degree threshold value while the increase amount of the depression force of the accelerator pedal 2 is decreased.

Moreover, in this embodiment, when the residual amount of the increase amount of the depression force of the accelerator pedal 2 at the timing t3 of FIG. 6 which is added to the base depression force is equal to or greater than a predetermined amount which is previously set, a new increase amount of the depression force may be not added to the depression force of the accelerator pedal 2.

This is because the driver can feel the increase of the depression force of the accelerator pedal when the timing t3 is immediately after starting to decrease the increase amount of the depression force of the accelerator pedal 2 by which the base depression force is increased, and it is unnecessary to further increase the depression force of the accelerator pedal 2 in this state.

Moreover, when the accelerator opening degree becomes smaller than the increase amount cancel threshold value while the accelerator pedal 2 is returned, the increase amount of the depression force of the accelerator pedal 2 which is added to the base depression force may be eliminated at this time, and the depression force of the accelerator pedal 2 may be returned to the base depression force. This is because the driver does not excessively depress by the reaction in this case even when the increase amount of the depression force is decreased in the stepped manner.

Besides, in the above-described embodiment, when the accelerator opening degree becomes greater than the accelerator opening degree threshold value again (at the timing t3 of FIG. 6) while the predetermined increase amount of the depression force with respect to the base depression force is decreased, the increase amount of the depression force which is added at the timing (the timing t1 of FIG. 6) at which the accelerator opening degree becomes greater than the accelerator opening degree threshold value at the previous time is added to the depression force of the accelerator pedal 2 at this time. However, the depression force having the amount identical to the increase amount of the depression force which is added at the timing (the timing t1 of FIG. 6) at which the accelerator opening degree becomes the accelerator opening degree threshold value at the previous time is not necessarily added. That is, at the timing t3, the increase amount of the depression force which is smaller than the increase amount of the depression force that is added at the timing t1 may be added to the depression force of the accelerator pedal 2 at that time. It is only necessary that the increase amount of the depression force with respect to the base depression force at the timing t3 is greater than the increase amount of the depression force which is added at the timing t1, even when the increase amount of the depression force which is added at the timing t3 is smaller than the increase amount of the depression force which is added at the timing t1.

Besides, in the above-described embodiment, when the accelerator opening degree becomes equal to or smaller than the increase amount cancel threshold value, the predetermined increase amount of the depression force which is added to the base depression force is gradually decreased at the predetermined constant rate. However, the rate need not be constant. The predetermined increase amount of the depression force which is added to the base depression force may be gradually decreased while the rate is varied.

Figure 8:
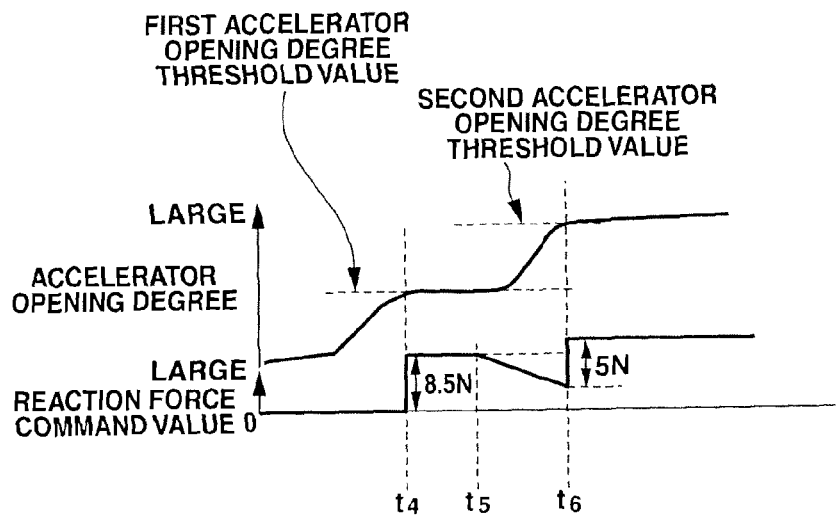
FIG. 8 is a timing chart showing various parameters in another embodiment of the present invention.

Next, another embodiment shown in FIG. 8 is illustrated. In the embodiment shown in FIG. 8, when the accelerator opening degree becomes greater than a first accelerator opening degree threshold value, a first depression force increase amount (for example, 8.5 [N]) is added to the base depression force on the depression side in the depression force of the accelerator pedal 2. Moreover, when the accelerator opening degree becomes a second accelerator opening degree threshold value greater than the first accelerator opening degree threshold value by a predetermined opening degree, a second depression force increase amount (for example, 5 [N]) is further added to the first depression force increase amount in the depression force of the accelerator pedal 2. (for example, when the accelerator opening degree threshold value is set at each shift line of FIG. 5.)

Then, when the accelerator pedal 2 is returned in a state where the first depression force increase amount is added to the base depression force on the depression side of the depression force of the accelerator pedal, the addition of the first depression force increase amount continues up to the increase amount cancel threshold value which is smaller than the first accelerator opening degree threshold value by the predetermined opening degree. Then, when the accelerator opening degree is decreased to be equal to or smaller than the increase amount cancel threshold value, the first depression force increase amount is canceled, and the depression force of the accelerator pedal is returned to the base depression force.

In this case, in the state where the first depression force increase amount is added to the base depression force on the depression side of the depression force of the accelerator pedal, when a predetermined time period elapses or the vehicle runs a predetermined distance, the role of informing the fuel consumption rate transition of the driver is finished even when the accelerator opening degree is not decreased to be equal to or smaller than the increase amount cancel threshold value. Accordingly, the first depression force increase amount is gradually decreased at the constant rate (timing t5 of FIG. 8). Then, when the accelerator opening degree becomes greater than the second accelerator opening degree threshold value (the timing t6 in FIG. 8) while the first depression force increase amount is decreased, the second depression force increase amount is added to the depression force of the accelerator pedal 2 at this time.

By the above-described method, when the accelerator opening degree becomes the second accelerator opening degree threshold value, as to the depression force increase amount which is added to the base depression force, the addition of the depression of the accelerator pedal is easy to be performed relative to a case where the second depression force increase amount is further added to the first depression force increase amount.

The invention claimed is:

1. An accelerator pedal depression force control apparatus comprising:
   an accelerator opening degree sensor configured to sense an accelerator opening degree, and
   a depression force varying mechanism configured to vary a depression force of an accelerator pedal,
   wherein the accelerator pedal depression force control apparatus being configured
   to increase the depression force of the accelerator pedal to be greater than a base depression force by a predetermined increase amount of the depression force when the accelerator opening degree becomes greater than a predetermined accelerator opening degree threshold value, and
   to decrease the predetermined increase amount of the depression force at a predetermined rate when a predetermined depression force increase cancel condition is satisfied when the depression force of the accelerator pedal is increased to be greater than the base depression force, and to increase the depression force of the accelerator pedal with respect to the base depression force so that the increase amount of the depression force with respect to the base depression force becomes greater than the predetermined increase amount of the depression force when the accelerator opening degree becomes greater than the predetermined accelerator opening degree threshold value while the predetermined increase amount of the depression force is decreased.

2. The accelerator pedal depression force control apparatus as claimed in claim 1, wherein a new increase amount of the depression force is not added to the depression force of the accelerator pedal when a residual amount of the predetermined increase amount of the depression force is equal to or greater than a predetermined amount when the accelerator opening degree becomes greater than the predetermined accelerator opening degree threshold value while the predetermined increase amount of the depression force is decreased.

3. The accelerator pedal depression force control apparatus as claimed in claim 1, wherein when the predetermined depression force increase cancel condition is satisfied while the accelerator pedal is returned, the predetermined increase amount of the depression force is eliminated at that time, and the depression force is returned to the base depression force.

4. The accelerator pedal depression force control apparatus as claimed in claim 1, wherein when the accelerator opening degree becomes greater than the predetermined accelerator opening degree threshold value while the predetermined increase amount of the depression force is decreased, the depression force of the accelerator pedal is increased by the predetermined increase amount of the depression force with respect to the depression force of the accelerator pedal at that time.

5. The accelerator pedal depression force control apparatus as claimed in claim 1, wherein the accelerator pedal depression force control apparatus is configured to increase the depression force of the accelerator pedal to be greater than the base depression force by a first increase amount of the depression force when the accelerator opening degree becomes greater than a first accelerator opening degree threshold value, to further increase the depression force of the accelerator pedal by a second increase amount of the depression force with respect to the increase of the first increase amount of the depression force when the accelerator opening degree becomes greater than a second accelerator opening degree threshold value which is greater than the first accelerator opening degree threshold value by a predetermined opening degree, to decrease the first increase amount of the depression force when the predetermined depression force increase cancel condition is satisfied while the accelerator pedal depression force is increased to be greater than the base depression force by the first increase amount of the depression force, and then when the accelerator opening degree becomes greater than the second accelerator opening degree threshold value, to increase the depression force of the accelerator pedal by the second increase amount of the depression force with respect to the depression force of the accelerator pedal at a timing at which the accelerator opening degree becomes greater than the second accelerator opening degree threshold value.

6. The accelerator pedal depression force control apparatus as claimed in claim 1, wherein the predetermined accelerator opening degree threshold value is increased in accordance with an increase of a vehicle speed.

* * * * *